Oct. 17, 1939.　　　L. N. SHAKER　　　2,176,278
AUTOMATIC WINDING MECHANISM FOR TIMEPIECES
Original Filed Nov. 5, 1936　　2 Sheets-Sheet 1
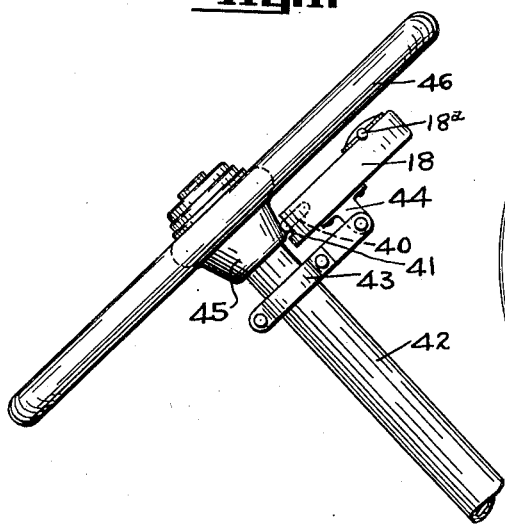
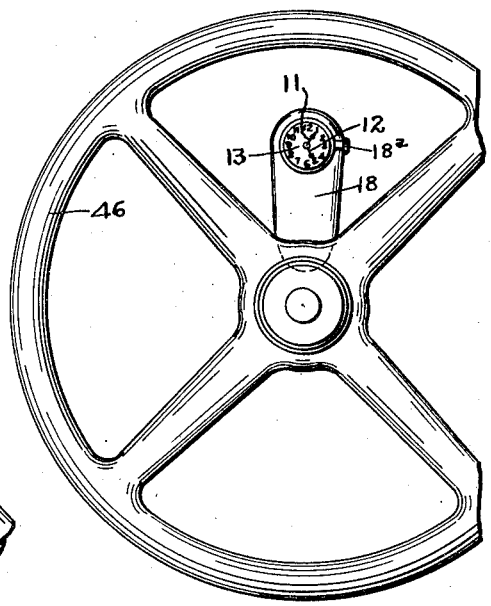
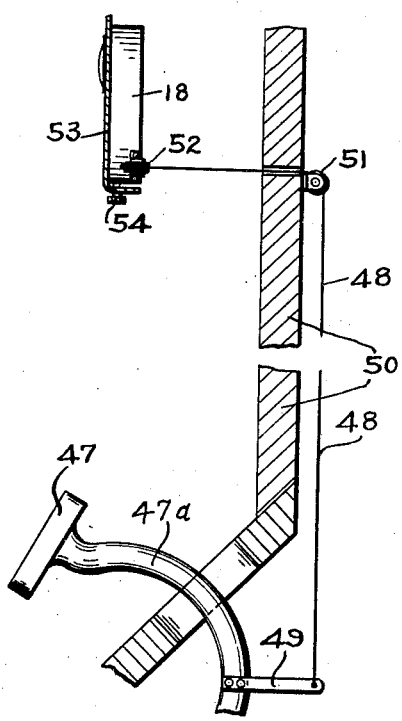
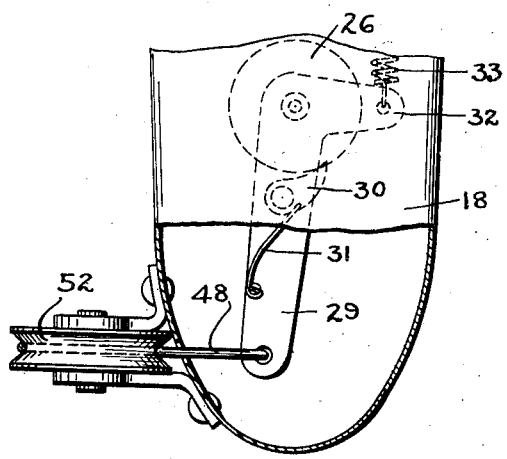
INVENTOR
*Louis N. Shaker.*
BY *H. G. Manning*
ATTORNEY Oct. 17, 1939.   L. N. SHAKER   2,176,278
AUTOMATIC WINDING MECHANISM FOR TIMEPIECES
Original Filed Nov. 5, 1936   2 Sheets-Sheet 2
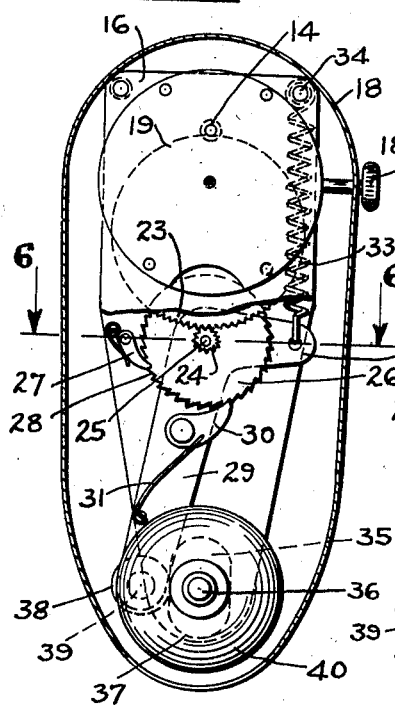
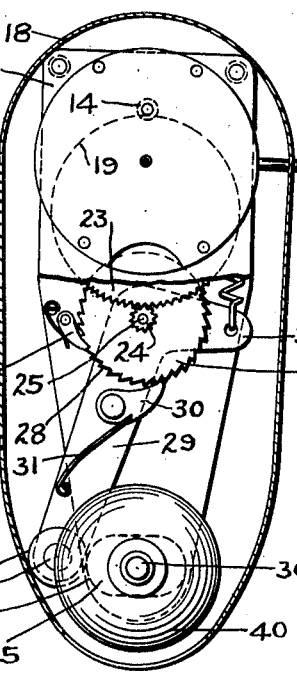
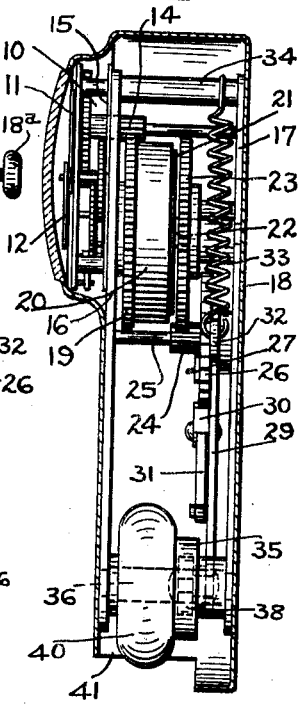
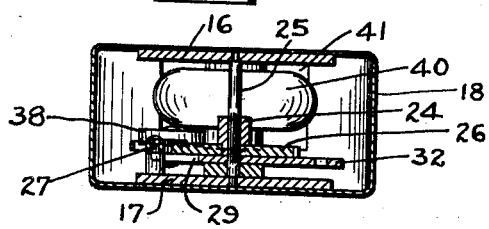
INVENTOR
Louis N. Shaker.
BY H. G. Manning
ATTORNEY Patented Oct. 17, 1939

2,176,278

UNITED STATES PATENT OFFICE 2,176,278

AUTOMATIC WINDING MECHANISM FOR TIMEPIECES

Louis N. Shaker, Waterbury, Conn.

Application November 5, 1936, Serial No. 109,326
Renewed January 11, 1939

2 Claims. (Cl. 58—46)

This invention relates to timepieces for vehicles, and more particularly to an improvement in such a timepiece, whereby it will be automatically wound by the oscillation of the steering wheel while the vehicle is being driven.

One object of this invention is to provide a mechanism of the above nature which is adapted to be detachably installed upon a fixed part of an automobile, motor boat, or other vehicle, and which will be partially wound by each operation of a manually driven movable part, such as the steering wheel.

Another object is to provide an automatically wound timepiece of the above nature in which the winding mechanism is provided with improved means whereby the amount of winding of the timepiece may be controlled and limited.

A further object is to provide an automatic winding mechanism for an automobile timepiece of the above nature having a spring-pressed lever adapted to be oscillated by means actuated by a motion of the operator's hand or foot to partially wind the main spring of the timepiece.

A further object is to provide a timepiece of the above nature which will be simple in construction, inexpensive to manufacture, readily manipulated, compact, ornamental in appearance, and very efficient and durable in use.

With these and other objects in view, there have been illustrated on the accompanying drawings two forms in which the invention may be conveniently embodied in practice.

In the drawings:

Fig. 1 illustrates an automobile steering wheel and post having installed thereon a timepiece, and automatic winding means actuated by the oscillating motion of said steering wheel.

Fig. 2 is a face view of the same.

Fig. 3 is a sectional view on an enlarged scale of the enclosing casing, and the interior winding mechanism, shown in inoperative position.

Fig. 4 is a view similar to Fig. 3, showing the parts of the mechanism with the winding spring under tension preparatory to winding the main spring of the timepiece.

Fig. 5 is a side sectional view of the same with the operating parts in the position shown in Fig. 1.

Fig. 6 is a cross-sectional view taken on the line 6—6 of Fig. 3.

Fig. 7 is a schematic view of a modified form of the invention for actuating the clock winding mechanism which is adapted to be operated by the oscillation of the foot-operated brake pedal.

Fig. 8 is a rear view of the apparatus shown in Fig. 7 with the casing partly broken away.

Referring now to the drawings wherein like reference numerals indicate the same parts throughout the several views, the numeral 10 indicates generally a timepiece including a watch movement having the usual hands 11 and 12 and front dial face 13. A pinion arbor 14 extends rearwardly through a movement-supporting frame 15 and through a front elongated frame member 16, said pinion arbor being also supported by a similar rear frame member 17, both of said members 16 and 17 being contained within an oval-shaped casing 18. The casing 18 encloses the clock and operating mechanism except for the usual hand setting thumb piece 18a which projects outwardly therethrough. The pinion of the arbor 14 meshes with the usual large gear 19 secured to a main spring casing 20, to one end of which the main spring 21 is fastened. The other end of the main spring 21 is, as usual, fastened to a center spindle 22 which is also provided with a large gear 23, meshing with a pinion 24 secured on a lower spindle 25 upon which is mounted a ratchet wheel 26. Both of the spindles 22 and 25 are journaled in the frame members 16 and 17.

In order to prevent rearward rotation of the ratchet wheel 26, provision is made of a spring-pressed pawl 27 pivoted to a fixed part of the mechanism.

In order to rotate the ratchet wheel 26 in a direction to wind up the main spring 21 intermittently, provision is made of a bell-crank lever 29 pivoted on the spindle 25 and carrying a spring-pressed pawl 30 located in engagement with the teeth 28 of the ratchet wheel and at a point directly below it, as shown in Fig. 4. The lever 29 has a side arm 32 to which one end of a vertical coiled spring 33 is secured, the other end of said spring being connected to an upper horizontal post 34 disposed between the frame members 16 and 17. By means of this construction, it will be evident that when the lever 29 is swung clockwise, the pawl 30 will ride over the ratchet wheel 26 past one or more teeth 28 thereof. The subsequent release of the lever 29 will permit the spring 33 to act, through the arm 32, to swing the bell-crank lever in a counter-clockwise direction and rotate the ratchet wheel 26, the pinion 24, and the gear 23 to partially wind up the main spring 21.

In order to prevent the possibility of over-winding the main spring, the tension of the coiled winding spring 33 is made such that it will be insufficient to overcome the main spring when the latter has been wound to the desired degree. Consequently, when this condition takes place, no further swinging of the lever 29 will occur.

The means provided for automatically swinging the lever 29 to cause it to operate as above described, comprises a substantially elliptical cam 35 mounted upon a spindle 36 journaled in and extending between the frame members 16 and 17 at the lower end thereof. Rotation of the cam 35 to the position shown in Fig. 3 will, through its two opposed camming surfaces 37, cause the lever 29 to swing in a clockwise direction by means of a cam follower or roller 38, rotatably mounted upon a stud 39 secured to the lever 29 adjacent the cam 35. The cam 35 is adapted to be driven by an actuating roller 40 secured to the spindle 36, and is adapted to have a portion of its periphery extending through an opening 41 formed in the lower end of the casing 18. The roller 40 is preferably surfaced with rubber or like friction material to increase its driving grip upon the surface of a steering wheel or other control member.

The mechanism above described is adapted to be mounted upon the steering column 42 of an automobile, motor boat, or other vehicle by a clamping device 43 secured to a bracket 44 mounted on the rear wall of the casing 18, as shown in Fig. 1. The casing 18 is so held by the clamp device 43 that the roller 40 will drivingly engage the hub 45 of the steering wheel 46 as it is turned back and forth during the operation of the automobile. Rotation of the wheel 46 in either direction will rotate the roller 40 and with it the cam 35 sufficiently to oscillate the lever 29.

Referring now to the modification of the invention shown in Figs. 7 and 8, the actuating member for the timepiece winding mechanism is a foot-operated member 47, such as the clutch or brake pedal of an automobile, instead of the hand-operated manually actuated steering wheel 46, as in the first form of the invention. The lever 29 is connected to the curved clutch pedal arm 47a by a flexible cable, whereby said lever will be swung at each movement of said pedal 47. The cable 48 is attached to a link 49 rigidly secured to the curved pedal arm 47a, and travels over a pulley 51 mounted on the dash 50, and then through said dash and over a pulley 52 mounted on the casing 18. From the pulley 52, the cable 48 is led into the casing and secured to the free end of the lever 29 (see Fig. 8). The timepiece 10 in this instance may be mounted on the instrument panel board 53 of the automobile, and has its hand set thumb piece 54 depending below the same. In this form of the invention, the cam 35 and its associated cam follower 38 and roller 40 are omitted.

*Operation*

In the operation of the first form of the invention shown in Figs. 1 and 2, the timepiece will be partially wound whenever the steering wheel 46 is swung in either direction, due to the actuation of the lever 29 by the rotating cam 35 from the position shown in Fig. 3 to that shown in Fig. 4, and the subsequent action of the coiled spring 33 in returning the lever 29 to its original position. It will be understood that when the main spring is wound to the tightness desired, the tension of the spring 33 will not be enough to overcome the backwardly directed tension of the main spring 21, and hence the lever 29 will remain stationary in the position shown in Fig. 4 until the timepiece has run long enough to reduce the tension of the main spring sufficiently to permit the coiled spring 33 to return the lever to "cam-following" position.

In both forms of the invention herein disclosed, the timepiece will be automatically wound by the actuation of a manually-operable control member of a vehicle—the steering wheel 46 in one instance, and the foot-pedal 47 in another. The above action is automatic in the sense that it takes place without attention on the part of the driver.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an automatic winding mechanism for a mainspring driven timepiece having a time train, a casing for said timepiece, means for detachably securing said casing to the fixed steering column behind a vehicle steering wheel having a hub, a rotatable ratchet wheel operatively connected to said time train, a swingable bell-crank lever mounted in said casing, said lever carrying a spring pressed pawl for engaging said ratchet wheel, a second pawl engaging said ratchet wheel and pivotally connected to said casing, a winding spring secured to said casing and initially stronger than said mainspring and being connected to one arm of said bell-crank lever for urging said lever in a direction to wind said mainspring, a friction roller mounted in said casing and operatively engaging said hub, and a cam connected to said roller and operatively engaging the other end of said bell-crank lever to swing said lever to energize said winding spring whenever said steering wheel is operated in either direction.

2. In an automatic winding mechanism for a main spring driven timpiece having a time train, a frame for said timepiece, a casing surrounding said frame, means for detachably securing said casing to a vehicle steering column below a steering wheel having a hub, pawl and ratchet mechanism carried by said frame and operatively connected to said time train, a swingable lever secured to said frame for intermittently operating said pawl and ratchet mechanism, a winding spring secured to said frame and to said lever, said spring being initially stronger than said main spring, when energized, for urging said lever in a direction to wind said main spring, a friction roller projecting from said casing into contact with said hub, and a cam connected with said roller for operatively engaging said lever to cause it to energize said winding spring whenever said steering wheel is turned in either direction.

LOUIS N. SHAKER.